United States Patent [19]
Freudenberger

[11] Patent Number: 5,341,689
[45] Date of Patent: Aug. 30, 1994

[54] PEN FORCE GAGE FOR A PEN PLOTTER

[75] Inventor: Richard Freudenberger, Fountain Valley, Calif.

[73] Assignee: CalComp Inc., Anaheim, Calif.

[21] Appl. No.: 54,488

[22] Filed: Apr. 30, 1993

[51] Int. Cl.⁵ .............................................. G01L 1/00
[52] U.S. Cl. .................... 73/862.541; 73/862.05; 346/146
[58] Field of Search ............. 73/862.541, 862.51, 73/862.041, 862.05, 865.4, 862.639; 395/103, 105; 346/141, 146; 400/157.3; 116/200; 33/23.11; 369/253, 254

[56] References Cited

U.S. PATENT DOCUMENTS

| | | | |
|---|---|---|---|
| 2,375,820 | 5/1945 | Ridings et al. | 346/139 C |
| 3,496,779 | 2/1970 | Peters | 73/862.541 |
| 3,753,384 | 8/1973 | Anfindsen | 346/141 X |
| 3,956,734 | 5/1976 | Radcliffe, Jr. | 73/865.4 X |
| 4,111,052 | 9/1978 | Sniderman | 73/865.4 X |
| 4,142,175 | 2/1979 | Herbst et al. | 73/865.4 X |
| 4,143,357 | 3/1979 | Baver et al. | 73/865.4 X |
| 4,277,070 | 7/1981 | Dinsdale et al. | 369/254 |
| 4,567,565 | 1/1986 | Haselby et al. | 395/103 X |
| 4,660,481 | 4/1987 | Spickermann | 73/862.541 X |
| 4,722,080 | 1/1987 | Dieckmann | 369/254 |
| 4,869,187 | 9/1989 | Little et al. | 73/862.041 X |
| 4,888,710 | 12/1989 | Venthem et al. | 395/103 X |
| 5,170,047 | 12/1992 | Beauchamp et al. | 395/103 X |
| 5,202,958 | 4/1993 | Kobayashi | 395/103 X |
| 5,261,038 | 11/1993 | Adroher et al. | 395/103 |
| 5,262,797 | 11/1993 | Boeller et al. | 395/103 X |

*Primary Examiner*—Richard E. Chilcot, Jr.
*Assistant Examiner*—Elizabeth L. Dougherty
*Attorney, Agent, or Firm*—Frederic P. Smith; William F. Porter, Jr.

[57] ABSTRACT

A pen force gage for a pen plotter for determining whether the force of a pen positioned by a pen support onto the surface of a drawing media in the pen plotter falls within an acceptable range. The pen force gage includes structure for aligning or positioning the gage within the pen plotter so as to enable the gage to measure the force of the pen; a pivotable arm configured at one end to interact with the pen support as the pen moves toward the surface of the media and at the other end to support a movable weight to determine the force to be applied by the pen on the surface of the media; and an indicator and a reference mark for determining whether the force falls within the acceptable range.

12 Claims, 2 Drawing Sheets

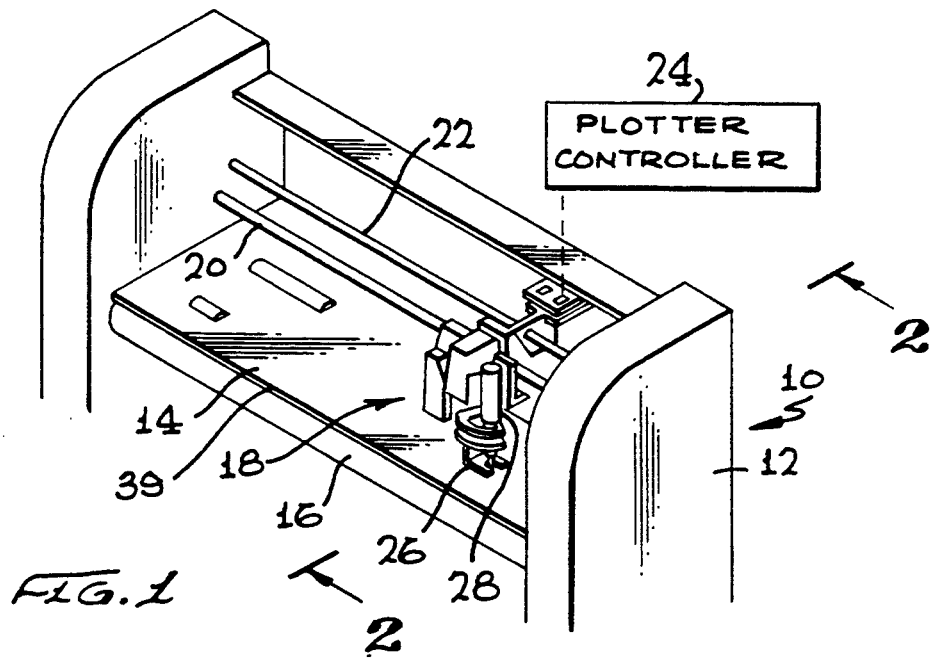
FIG. 1
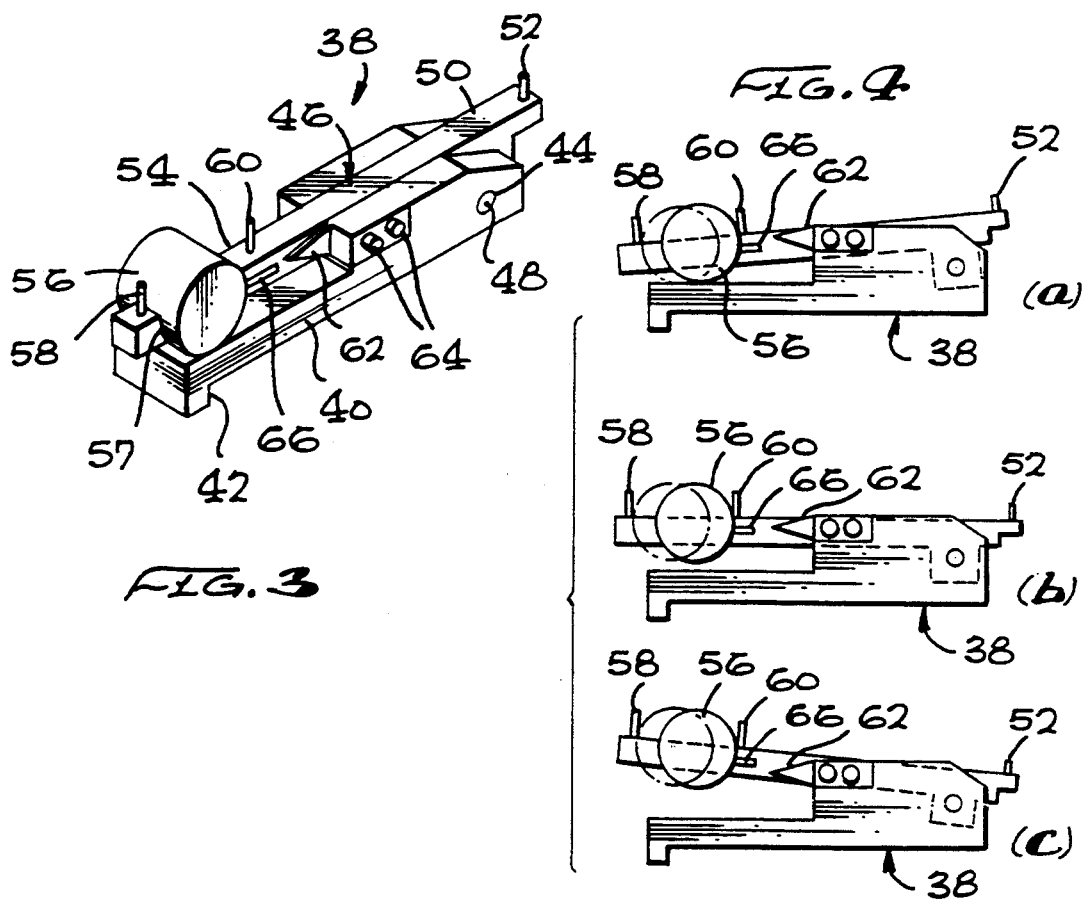
FIG. 3
FIG. 4

PEN FORCE GAGE FOR A PEN PLOTTER

BACKGROUND OF THE INVENTION

1. Field of the Invention

This invention relates to the field of pen plotters and, in particular, to a pen force gage for a pen plotter for determining whether the force of a pen on the surface of a drawing media falls within an acceptable range.

2. Description of Related Art

In the field of plotters using ink pens, it is necessary to ensure that an even and continuous line or trace is properly laid down on the surface of a drawing media during the plotting process. While numerous techniques have been employed to monitor the quality and continuity of the line on the surface itself and the quantity of ink in the pen reservoir, little attention has been paid to devising quick and inexpensive techniques and equipment for monitoring the force of the pen itself on the surface of the media. The proper application of such force is critical to a quality plot since too much force impairs the flow of ink from the pen and can also cause the pen to tear the media while too little force diminishes the capillary action which draws the proper amount of ink onto the surface of the media. While expensive force measuring apparatus using electronic equipment and sophisticated operating techniques are used to properly set the pen force at the manufacturing site, such apparatus is rarely used in the field to check the pen force at the site of usage due to its cost, size and complexity.

Thus, it is a primary object of the present invention to provide an improved pen force gage for a pen plotter.

It is another object of the present invention to provide an improved pen force gage for a pen plotter suitable for field use.

It is a further object of the present invention to provide an improved pen force gage for a pen plotter which is inexpensive and easy to use.

It is still another object of the present invention to provide an improved pen force gage for a pen plotter which can be used to quickly determine whether the pen force on the surface of a media falls within an acceptable range.

SUMMARY OF THE INVENTION

A pen force gage for a pen plotter is provided for determining whether the force of a pen positioned by a pen support onto the surface of a drawing media in the pen plotter falls within an acceptable range. The pen force gage comprises alignment means for positioning the gage within the pen plotter so as to enable the gage to measure the force of the pen; engagement means configured to interact with the pen support as the pen moves toward the surface of the media; measurement means coupled to the engagement means to determine the force to be applied by the pen on the surface of the media; and indicator means for indicating whether the force falls within the acceptable range.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a perspective simplified view of a typical pen plotter illustrating the environment of use of the present invention.

FIG. 3 is a perspective view of the pen force gage of the present invention.

FIGS. 4 a,b,c illustrate the method of using the pen force gage of the present invention.

DESCRIPTION OF THE PREFERRED EMBODIMENT

Figure 2:
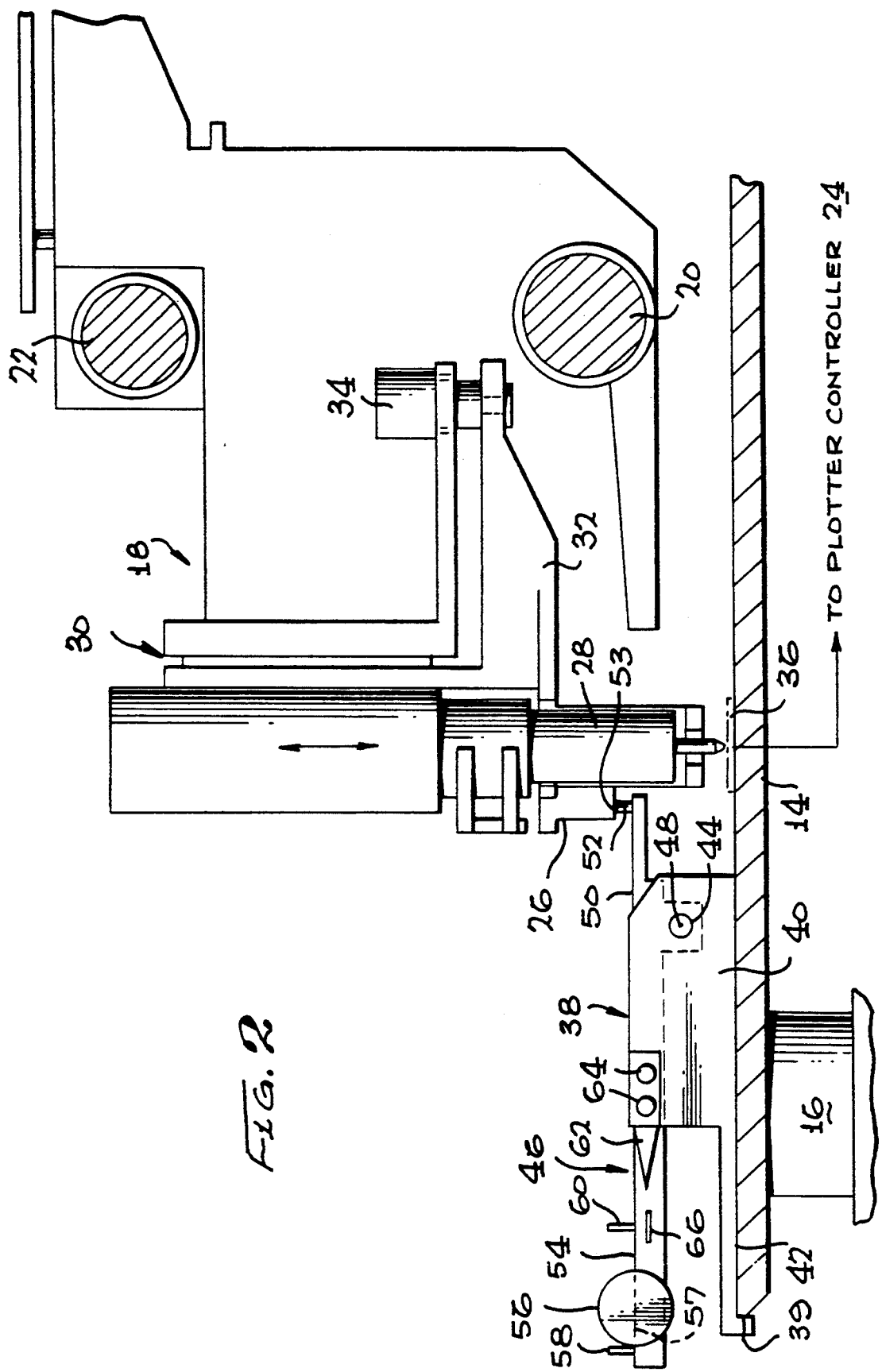
FIG. 2 is a cross-sectional view of the pen plotter of FIG. 1 taken along line 2—2 of FIG. 1.

Referring now to FIGS. 1 and 2, a typical pen plotter 10 is illustrated having an outer casing 12 and a platen 14 supported by a beam assembly 16. Mounted above the platen 14 is a carriage assembly 18 supported by rods 20,22 and driven transversely by a motor and belt assembly (not shown) controlled by plotter controller 24. The carriage assembly 18 includes a penholder 26 supporting a pen 28 and coupled to a ball-slide 30. Ball-slide 30 is moved in a direction normal to the platen 14 by lever 32 coupled to solenoid 34 which is controlled by plotter controller 24. During factory assembly and testing, a pressure transducer 36, shown in phantom, is placed between the platen 14 and the pen 28 and a varying voltage is applied to the solenoid 34 by plotter controller 24 to cause the pen 28 to press down on the transducer 36 which measures the force applied by the pen 28. When the varying voltage causes the transducer 36 to indicate a preselected force, such as 36 grams, the particular voltage is noted and stored by the plotter controller 24 to be used in all subsequent plotting operations.

Referring now to FIGS. 2-4 in which the pen force gage of the present invention and its method of use are illustrated, the pen force gage 38 includes a base 40 having a stepped bottom portion 42 which is used to position or place the gage 38 on the forward edge 39 of the platen 14. While the stepped bottom portion 42 is convenient, the base 40 could be merely aligned with the edge 39 of the platen 14 or with some other indicia on the platen 14. The base 40 has a pin 44 therethrough which also passes through arm 46 and serves as a pivot point 48 for arm 46. Arm 46 has a first portion 50 which extends from the base 40 into the direction of travel of the pen 28 and has a gage pin 52 which engages the penholder 26 at a selected surface 53 thereof and receives the downward force thereof. Arm 46 has a second portion 54 which moves opposite to the first portion 50 around pivot point 48, i.e. second portion 54 moves up when first portion 50 moves down and vice versa, and which has a movable weight 56 thereon which has a notch 57 therein which positions the weight 56 on the arm 46 and enables the weight 56 to slide along the arm 46. Second portion 54 has spaced pins 58,60 thereon which serve to limit the movement of the weight 56 and to enable the weight 56 to be set at two different positions, as described more fully hereinafter. Base 40 has an indicator 62 affixed thereto by bolts 64 which is used, in conjunction with reference mark 66 on second portion 54, to determine the position of second portion 54.

In usage then, the gage 38 is positioned on the platen 14 and the plotter controller 24 sends a signal voltage to the solenoid 34 to cause the penholder 26 and pen 28 to descend toward the platen 14. Previously, weight 56 has been slid next to pin 60 and has a prescribed mass chosen such that indicator 62 and reference mark 66 will line up when a selected lower limit pen force, such as 35 grams, is applied at gage pin 52. Thus, when penholder 26 and pen 28 descend and engage gage pin 52, indicator 62 and reference mark 66 will coact and assume the relative positions shown in FIGS. 4a,b and c depending on whether the pen force is less than, equal to, or greater than the lower limit pen force of 35 grams. Plotter controller 24 then sends a signal to solenoid 34 to cause the penholder 26 and pen 28 to ascend and weight 56 is slid next to pin 58, as shown in phantom in FIG. 4. Pin 58 is placed relative to pin 60 such that indicator 62 and reference mark 66 will line up when a selected upper limit pen force, such as 37 grams, is applied at gage pin 52. Thus when plotter controller 24 sends a signal to solenoid 34 to cause penholder 26 and pen 28 to again descend and engage gage pin 52, indicator 62 and reference mark 66 will coact and assume the relative positions shown in FIGS. 4a,b and c depending on whether the pen force is less than, equal to, or greater than the upper limit pen force of 37 grams. By combining the two measurements then, it can be easily and quickly determined whether the pen force is equal to or greater than the lower limit pen force of 35 grams and less than or equal to the upper limit pen force of 37 grams and thus whether the pen force (originally set at 36 grams) continues to remain within an acceptable range.

While the invention has been described with reference to a particular embodiment, it should be understood that the embodiment is merely illustrative as there are numerous variations and modifications which may be made by those skilled in the art. Thus, the invention is to be construed as being limited only by the spirit and cope of the appended claims.

I claim:

1. A pen force gage for a pen plotter for determining whether the force of a pen positioned by a pen support on the surface of a drawing media in said pen plotter falls within a range of upper and lower pen force limits comprising:

alignment means for positioning said gage within said pen plotter so as to enable said gage to measure said force of said pen;

engagement means for interacting with said pen support as said pen moves toward said surface of said media; and measurement means coupled to said engagement means for determining said force to be applied by said pen on said surface of said media, said measurement means including indicator means for indicating whether said force falls within said range of upper and lower pen force limits.

2. The gage of claim 1 wherein said pen plotter includes a platen and said gage rests on said platen of said pen plotter and is aligned with a portion thereof.

3. The gage of claim 2 wherein said alignment means includes a stepped bottom surface for mating with a forward edge of said platen to position said gage within said pen plotter.

4. The gage of claim 1 wherein said engagement means includes an arm pivotally mounted at a pivot point within said gage and having a first portion thereof extending from said gage into the direction of travel of said pen as said pen moves toward said surface of said media.

5. The gage of claim 4 wherein said arm is engage said pen support and receive the force thereof.

6. The gage of claim 5 wherein said arm includes a gage pin positioned on said arm to engage said pen support.

7. The gage of claim 4 wherein said arm has a second portion thereof extending from said gage and moving opposite to said first portion around said pivot point.

8. The gage of claim 7 wherein said measurement means includes a weight and said second portion movably carries said weight thereon, said measurement means including locating means coupled to said second portion to permit said weight being placed at a first two positions on said arm.

9. The gage of claim 8 wherein said locating means includes a pair of spaced pins located at a second two positions on said second portion of said arm, whereby said weight can be placed at said first two positions on said arm.

10. The gage of claim 8 wherein said gage has a base portion and said indicator means includes an indicator positioned on said base portion.

11. The gage of claim 10 wherein said second portion of said arm includes a reference mark thereon for coacting with said indicator to determine the position of said second portion of said arm.

12. The gage of claim 8 wherein said two positions of placement of said weight correspond to said upper and lower pen force limits of said range of said pen force.

* * * * *